US010630196B2

(12) United States Patent
Gerber et al.

(10) Patent No.: US 10,630,196 B2
(45) Date of Patent: Apr. 21, 2020

(54) APPARATUS FOR CONVERTING AN ELECTRICAL POWER OF ELECTROMAGNETIC WAVE INTO A DC ELECTRICAL VOLTAGE SIGNAL

(71) Applicant: Infineon Technologies AG, Neubiberg (DE)

(72) Inventors: Viktor Gerber, Munich (DE); Werner Simbuerger, Haar (DE); Valentyn Solomko, Munich (DE)

(73) Assignee: Infineon Technologies AG, Neubiberg (DE)

( * ) Notice: Subject to any disclaimer, the term of this patent is extended or adjusted under 35 U.S.C. 154(b) by 230 days.

(21) Appl. No.: 15/661,103

(22) Filed: Jul. 27, 2017

(65) Prior Publication Data

US 2018/0041134 A1 Feb. 8, 2018

(30) Foreign Application Priority Data

Aug. 8, 2016 (DE) .................. 10 2016 114 676

(51) Int. Cl.
*H02M 1/12* (2006.01)
*H02M 3/07* (2006.01)
(Continued)

(52) U.S. Cl.
CPC .............. *H02M 7/217* (2013.01); *H02M 1/12* (2013.01); *H02M 3/07* (2013.01); *H02M 5/458* (2013.01); *H04W 88/02* (2013.01)

(58) Field of Classification Search
USPC ......................................................... 307/104
See application file for complete search history.

(56) References Cited

U.S. PATENT DOCUMENTS 3,958,264 A * 5/1976 Magdo ................ H01L 27/1443
257/435
7,889,528 B2 * 2/2011 Shionoiri ............ H01L 27/0629
363/125
(Continued)

FOREIGN PATENT DOCUMENTS

DE 202007016235 U1 4/2009
DE 102015101600 * 8/2015
(Continued)

OTHER PUBLICATIONS

German Patent Office, Office Action issued for DE 102016114676.5, 10 pgs., dated Mar. 31, 2017.
(Continued)

*Primary Examiner* — Rexford N Barnie
*Assistant Examiner* — Xuan Ly
(74) *Attorney, Agent, or Firm* — Schiff Hardin LLP

(57) ABSTRACT

According to one embodiment, an apparatus for converting the electrical power of an electromagnetic wave into a DC electrical voltage signal is disclosed, the apparatus comprising a signal input region for receiving the electromagnetic wave, a signal output region for providing the DC electrical voltage signal, and a first conversion device, and the first conversion device comprising at least a first field-effect transistor element and a second field-effect transistor element, which is electrically coupled to the signal output region, the second field-effect transistor element being configured for series coupling to the first field-effect transistor element. According to this embodiment, the apparatus furthermore comprises at least one first capacitive element, which is electrically coupled to the signal input region, the first conversion device being configured in order to avoid at least one harmonic of the electromagnetic wave.

20 Claims, 12 Drawing Sheets

(51) Int. Cl.
    *H02M 5/458*    (2006.01)
    *H02M 7/217*    (2006.01)
    *H04W 88/02*    (2009.01)

(56) References Cited

U.S. PATENT DOCUMENTS

| | | | |
|---|---|---|---|
| 2011/0121864 A1 | 5/2011 | Maeda et al. | |
| 2011/0210784 A1* | 9/2011 | Lee | H01P 1/15 327/536 |
| 2015/0365013 A1* | 12/2015 | Hameed | H02M 7/25 363/126 |
| 2016/0190872 A1* | 6/2016 | Bohn | H02J 7/025 307/104 |

FOREIGN PATENT DOCUMENTS

| | | | |
|---|---|---|---|
| DE | 102015101600 A1 | | 8/2015 |
| DE | 10201510101600 | * | 8/2015 |
| JP | 2000-294786 A | | 10/2000 |
| JP | 2006034085 A | | 2/2006 |

OTHER PUBLICATIONS

Office Action dated Jul. 19, 2018 for Korean Patent Application No. 10-2017-0099383.

F. Kocer, et al, "A New Transponder Architecture With On-Chip Adc for Long-Range Telemetry Applications", IEEE Journal of Solid-State Circuits, vol. 41, No. 5, May 2006.

Office Action dated Jan. 7, 2019 issued for Korean Patent Application No. 10-2017-0099383.

* cited by examiner

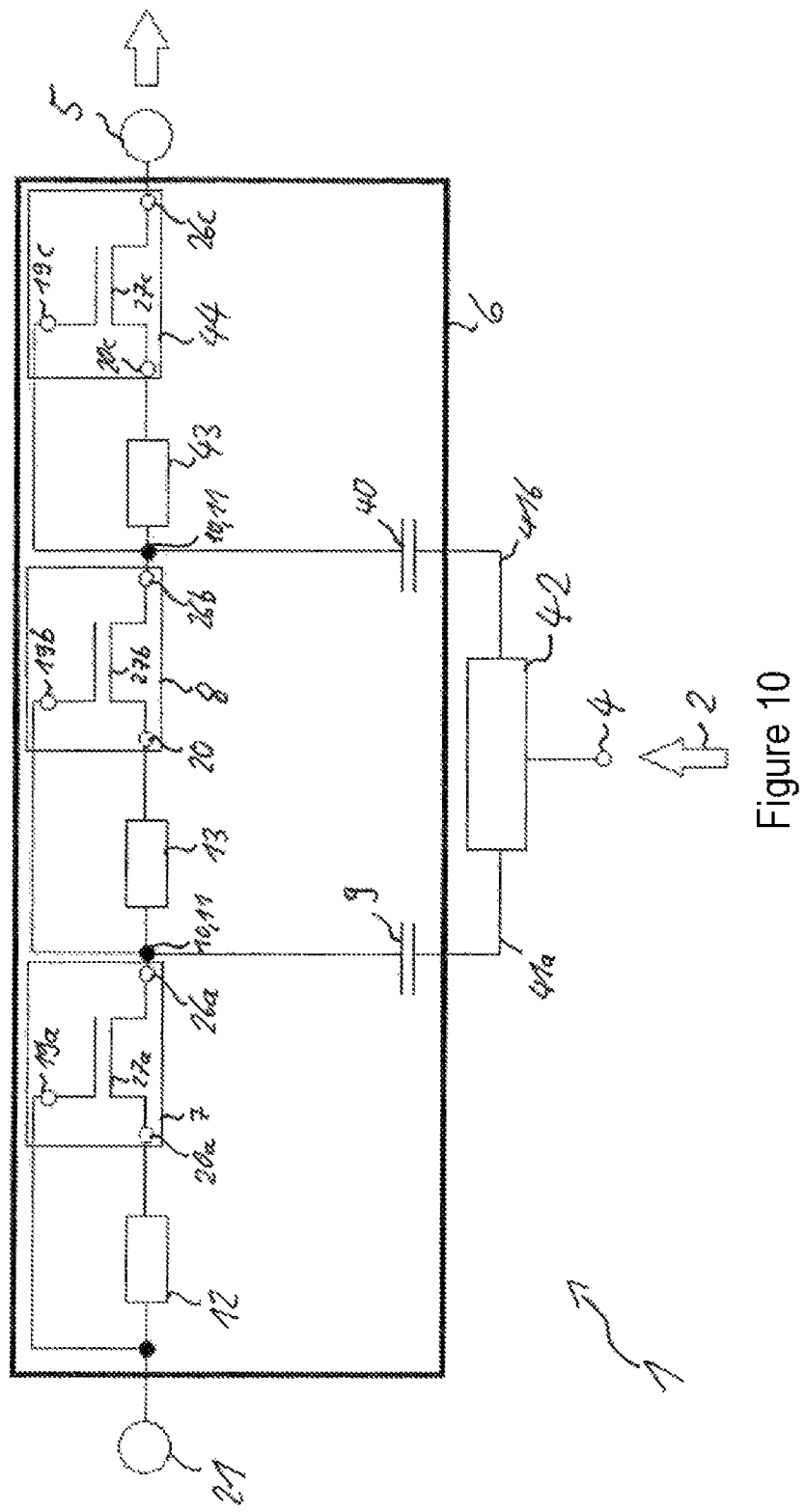

APPARATUS FOR CONVERTING AN ELECTRICAL POWER OF ELECTROMAGNETIC WAVE INTO A DC ELECTRICAL VOLTAGE SIGNAL

TECHNICAL FIELD

The present application relates in general to apparatuses which are suitable for converting electrical power of an electromagnetic wave into a DC electrical voltage signal. In some embodiments, the application relates to an apparatus configured for power detection of electromagnetic waves in the high-frequency range.

BACKGROUND

Antenna-based applications require power detectors, which are if possible intended to be implemented on the basis of CMOS technology. For these power detectors, it is necessary for them to receive a high-frequency power carried by an electromagnetic wave and output a DC electrical voltage which is in a fixed proportionality ratio to the received high-frequency power. Various aspects of these detectors are essential for the configuration and include their CMOS compatibility, a high sensitivity of the detector, a power consumption which is as low as possible, noise which is as low as possible in a DC voltage signal provided, and the smallest possible harmonics of the high frequency.

Various approaches are currently customary for complying as far as possible with the requirements of a corresponding power detector. In a first approach, passive pn diode-based or Schottky diode-based power detectors are used. For these, however, in particular the problems of high harmonics to a base high frequency and a lack of CMOS compatibility of many Schottky diode-based power detectors arise. In a second approach, active power detectors which are based on cascade or logarithmic amplifiers are used. However, the problem arises here of particularly high power consumption. In a third approach, thermal power detectors are used. These, however, have a very low sensitivity.

It is therefore an object to provide an apparatus having improved properties for converting the electrical power of an electromagnetic wave into a DC electrical voltage signal.

SUMMARY

An apparatus as claimed in claim 1 for converting the electrical power of an electromagnetic wave into a DC electrical voltage signal is provided. The dependent claims 2 to 12 define further embodiments. A mobile telephony device as claimed in claim 19, which comprises the apparatus for converting the electrical power of an electromagnetic wave into a DC electrical voltage signal and is based on an LTE standard, is furthermore provided.

According to one embodiment, the apparatus for converting the electrical power of an electromagnetic wave into a DC electrical voltage signal comprises a signal input region for receiving the electromagnetic wave and a signal output region for providing the DC electrical voltage signal. The apparatus furthermore comprises a first conversion device, the first conversion device comprising at least a first field-effect transistor element and a second field-effect transistor element, and the latter being electrically coupled to the signal output region and configured for series coupling to the first field-effect transistor element. The first conversion device furthermore comprises at least one first capacitive element, which is electrically coupled to the signal input region and is configured in order to avoid at least one harmonic of the electromagnetic wave.

Conversion may be understood as a process which, on the basis of a first perceived physical parameter of an object, generates a second physical parameter of this object, the first physical parameter of the object and the second physical parameter of the object being in a ratio, in particular a proportionality ratio. The object may in this case be an electromagnetic wave. The object may be a high-frequency electromagnetic wave. The first parameter may be an electrical power and/or the second parameter may be a DC electrical voltage. The object may be provided in the scope of the conversion. A conversion device may be provided for carrying out such a conversion.

Avoiding a harmonic may be understood as preventing the occurrence of this harmonic. Means for this avoidance, which suppress the occurrence of such a harmonic, may in this case be provided. These means may relate to the configuration and/or arrangement of electrical components. The basis for a potentially generatable harmonic, the occurrence of which can be avoided, may be an electromagnetic wave.

A high-frequency range may be understood as a range which comprises frequencies $f>3$ MHz. The high-frequency range may in this case lie in the range of 3 MHz$<f<$300 GHz. The high-frequency range may comprise the frequency bands HF (high frequency), VHF (very-high frequency), UHF (ultra-high frequency), SHF (super-high frequency) and EHF (extremely high frequency).

BRIEF DESCRIPTION OF THE DRAWINGS

For a more comprehensive understanding of various embodiments and for advantages connected with some embodiments, reference will now be made to the following descriptions in connection with the appended drawings, in which:

FIG. 10 schematically represents an alternative embodiment, which relates to the additional upstream provision of a balun, this embodiment comprising a first, second and third linearization element as well as a first and second capacitive element.

DETAILED DESCRIPTION OF ILLUSTRATED EMBODIMENTS

Figure 1:
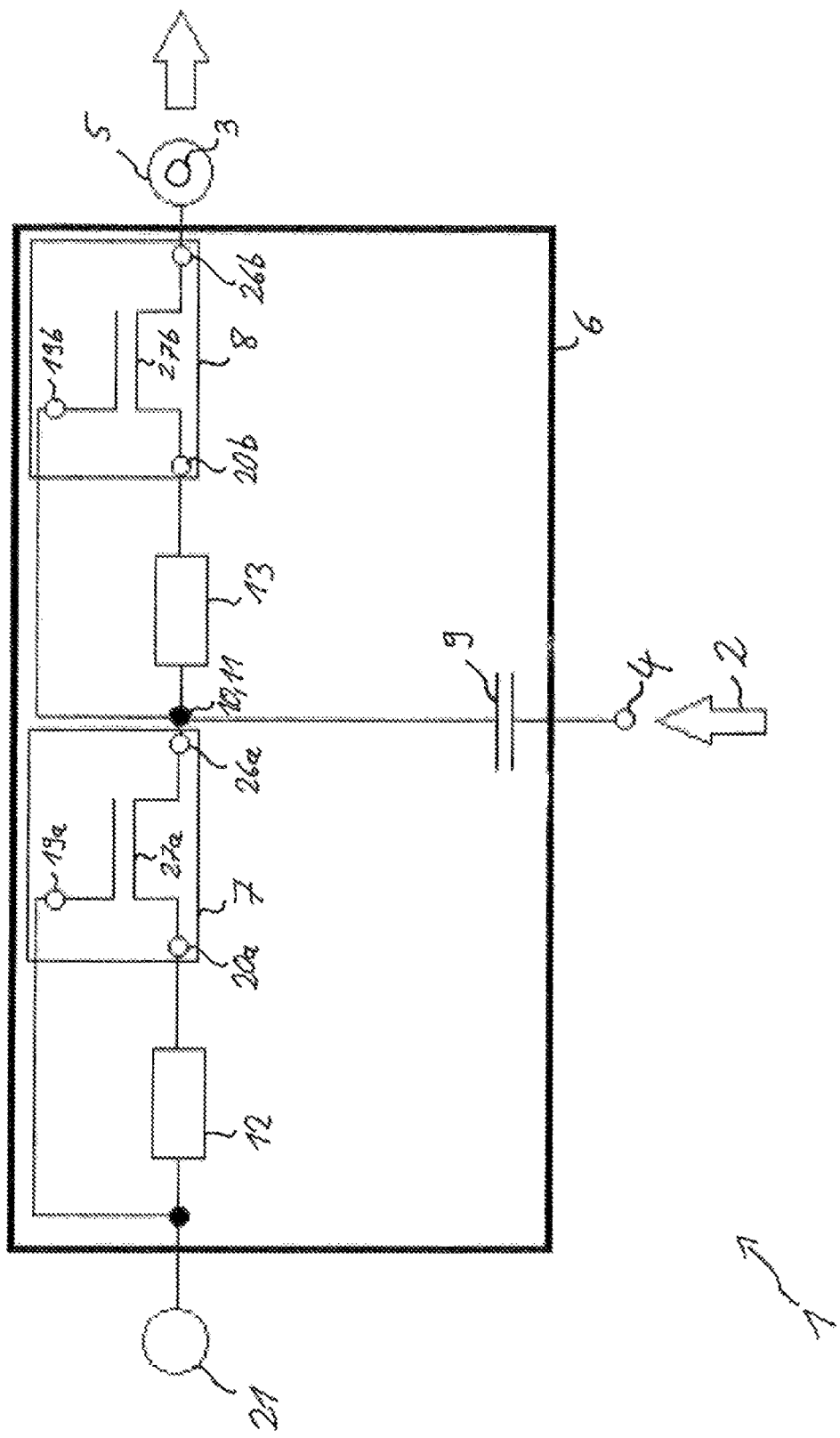
FIG. 1 schematically represents an embodiment which comprises a first and second linearization element.

FIG. 1 schematically represents an embodiment which comprises a first and second linearization element 12, 13.

The embodiment according to FIG. 1 is based in principle on the so-called Greinacher circuit. In relation thereto, diodes which are used in conventional Greinacher circuits are replaced or supplemented with field-effect transistor elements 7, 8. The embodiment is configured in order to avoid at least one harmonic of the electromagnetic wave 2. According to the embodiment of FIG. 1, the specific configuration of the first field-effect transistor element 7 and/or of the second field-effect transistor element 8 may be used for this. Thus, a high-impedance substrate resistance, or a substrate resistance $R \geq 500\Omega \times cm$, may be provided for this first field-effect transistor element 7 and/or for this second field-effect transistor element 8. Such a configuration may be suitable for complete avoidance of the first harmonic or each odd harmonic.

According to the embodiment according to FIG. 1 a first linearization element 12, which is electrically coupled to the first field-effect transistor element 7, and a second linearization element 13, which is electrically coupled to the second field-effect transistor element 8, may also be configured in order to avoid at least one harmonic of the electromagnetic wave 2. Such a configuration may be suitable for avoidance of the second harmonic or each even harmonic.

The apparatus 1 configured in order to convert an oscillating power signal of an electromagnetic wave 2 into a DC electrical voltage signal 3 may be suitable for use as a power detector of a high-frequency signal or may be supplemented to form a corresponding device.

According to the embodiment of FIG. 1, an apparatus 1 comprises a signal input region 4, a first conversion device 6 and a signal output region 5. The signal input region 4 may be used in order to receive an electromagnetic wave 2, having an electrically oscillating power, for its subsequent conversion. The signal output region 5 may furthermore be used in order to provide a DC electrical voltage signal 3 based on the electrical power of the received electromagnetic wave 2. The value of this DC electrical voltage signal 3 and the value of the power of the received electromagnetic wave 2 may in this case be in a proportionality ratio to one another. The signal input region 4 and the signal output region 5 may be electrically coupled by means of the electrical interconnection of the first conversion device 6. The apparatus according to the embodiment of FIG. 1 may furthermore also comprise an additional voltage source 21, which may provide a bias voltage to the first conversion device 6. In some embodiments, the additional voltage source 21 may also be omitted. Reference will be made to the following figures regarding the possibilities of specific configuration of such an additional voltage source.

The first conversion device 6 is configured for conversion of the electrical power of the received electromagnetic wave 2 into a DC electrical voltage signal 3. The first conversion device 6 comprises an electrical circuit, which is electrically connected to the signal input region 4 and to the signal output region 5. The first conversion device 6 comprises at least one first capacitive element 9, the first field-effect transistor element 7 and the second field-effect transistor element 8. The circuit of the first conversion device 6 may essentially be configured according to a so-called Greinacher circuit, in which case the first field-effect transistor element 7 and the second field-effect transistor element 8 may replace the diodes in the conventional Greinacher circuit or be electrically coupled to these diodes. According to the embodiment of FIG. 1, the first capacitive element 9 may comprise a multiplicity of capacitors arranged in series. The first capacitive element 9 may furthermore be arranged directly at the signal input region 4 and/or may be connected immediately after the signal input region 4.

The first field-effect transistor element 7 and the second field-effect transistor element 8 of the first conversion device 6 may respectively comprise a gate terminal 19a, 19b, a bulk terminal 27a, 27b, a source terminal 26a, 26b and a drain terminal 20a, 20b. The first field-effect transistor element 7 may be configured identically or differently to the second field-effect transistor element 8. In the embodiment of FIG. 1, the first field-effect transistor element 7 and the second field-effect transistor element 8 may respectively be configured as a field-effect transistor of the silicon-on-insulator (SOI) type. The second field-effect transistor element 8 may be arranged directly at the signal output region 5 and/or may be electrically connected immediately before the signal output region 5. Electrical coupling between the second field-effect transistor element 8 and the signal output region 5 may be provided by means of a source terminal 26b or a drain terminal 20b of the second field-effect transistor element 8. In the embodiment of FIG. 1, bulk terminals 27a, 27b and source terminals 26a, 26b of the respective first field-effect transistor element 7 and of the respective second field-effect transistor element 8 may further respectively be short-circuited to one another. In this way, a higher symmetry can be obtained in the configuration of the first transformation device 6, which may have a positive effect on the avoidance of at least one harmonic of the electromagnetic wave 2.

In order to avoid the at least one harmonic of the electromagnetic wave 2, a coupling element 10 may furthermore be configured between a first capacitive element 9, a first field-effect transistor element 7 and a second field-effect transistor element 8. The coupling element 10 may be configured as a common node 11 of the first capacitive element 9, the first field-effect transistor element 7 and the second field-effect transistor element 8. The common node 11 may be configured as a high-frequency input node. Such a common node may allow series coupling of a first field-effect transistor element 7 and of a second field-effect transistor element 8. Such a configuration may in one embodiment lead to a higher symmetry in the structural arrangement of the first conversion device 6, which may have a positive effect on the avoidance of at least one harmonic of the electromagnetic wave 2.

According the embodiment of FIG. 1, a first linearization element 12 and a second linearization element 13 may furthermore be provided. The first linearization element 12 may be electrically coupled between the gate terminal 19a and the drain terminal 20a. The second linearization element 13 may be electrically coupled between the gate terminal 19b and the drain terminal 20b. By such electrical coupling and linearization, an improved symmetry can be obtained in the structural arrangement of the first conversion device 6. This may have a positive effect on the avoidance of the second harmonic, or the avoidance of all even harmonics, of the electromagnetic wave 2.

According the embodiment of FIG. 1, the first conversion device 6 may be configured symmetrically. With reference to FIG. 1, this may be understood as meaning that the region of the first conversion device 6 depicted on the left-hand side of the node 11 is identical or at least nominally identical (i.e. apart from process tolerances and the like) to the region of the first conversion device 6 depicted on the right-hand side of the node. In such a case, in a thought experiment, the left-hand region of the first conversion device 6 would be convertible into the right-hand region of the first conversion device 6 by a horizontal displacement.

Figure 2:
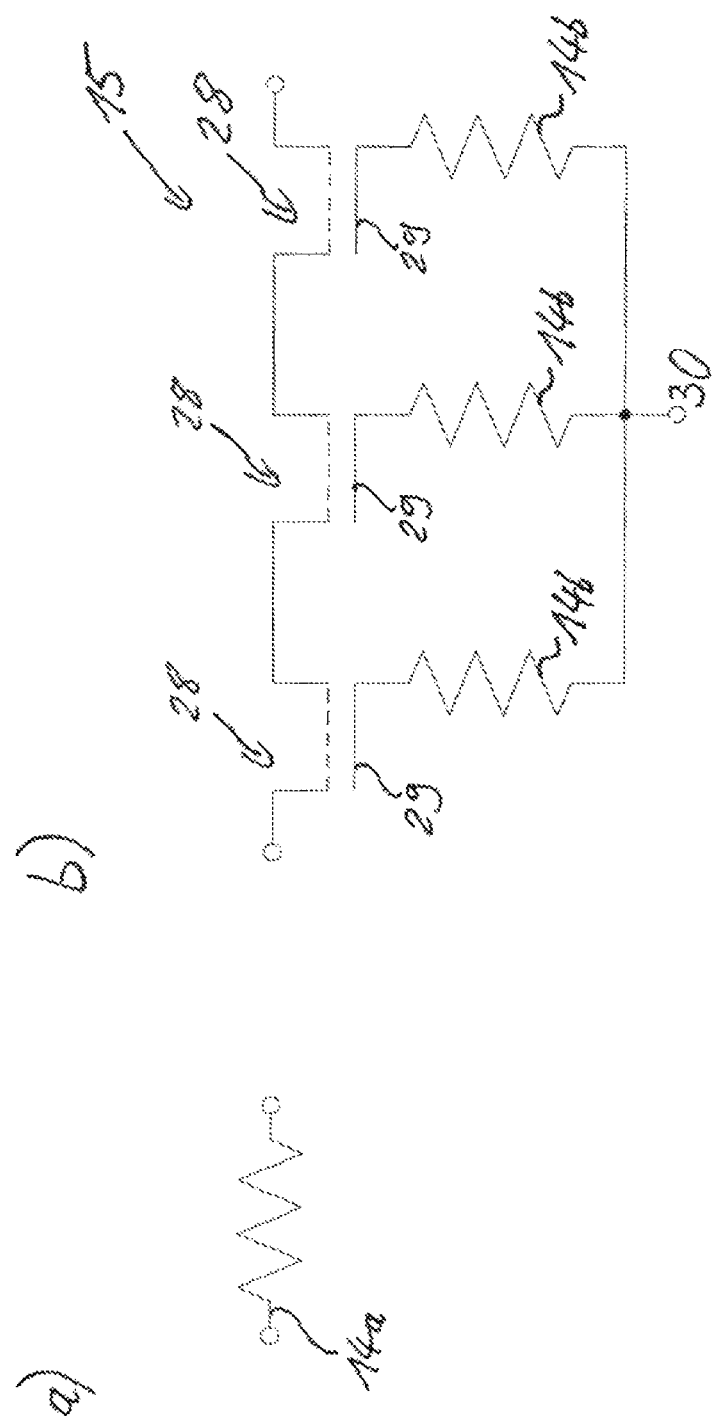
FIG. 2, which comprises FIG. 2a and FIG. 2b, schematically represents embodiments of a linearization element according to one embodiment of the apparatus for converting the electrical power of an electromagnetic wave into a DC electrical voltage signal.

FIG. 2, which comprises FIG. 2a and FIG. 2b, schematically represents embodiments of a linearization element 12, 13 according to one embodiment of the apparatus 1 for converting the electrical power of an electromagnetic wave 2 into a DC electrical voltage signal 3.

According to FIG. 2a, the first linearization element 12 and/or the second linearization element 13 may be configured as an ohmic resistance 14a. According to FIG. 2b, the first linearization element 12 and/or the second linearization element 13 may be configured as a high-frequency switch 15. The configurations of the first linearization element 12 and/or of the second linearization element 13 as referred to in FIG. 2 are, however, not exhaustive. Rather, other configurations of the first linearization element 12 and/or of the second linearization element 13 are also possible.

The high-frequency switch 15 according to the embodiment of FIG. 2b comprises an arbitrary multiplicity of field-effective transistor elements 28 arranged in series. The field-effective transistor elements 28 of the high-frequency switch may be configured identically or configured differently to one another. At least one of the field-effective transistor elements 28 may have properties that are configured nominally identically (i.e. excepting process tolerances or the like) to the corresponding properties of the first field-effect transistor element 7 and/or of the second field-effect transistor element 8, in which case such properties may relate to the transistor type, the transistor geometry, the transistor width and/or the transistor length. The field-effect transistors 28 respectively have a gate 29, the electrical potential of which can be controlled by a control unit 10 respectively via an ohmic resistance. According to the embodiment of FIG. 3b, the field-effective transistor elements are configured as normally-off components (i.e. for example they are nonconductive without an applied gate voltage).

Figure 3:
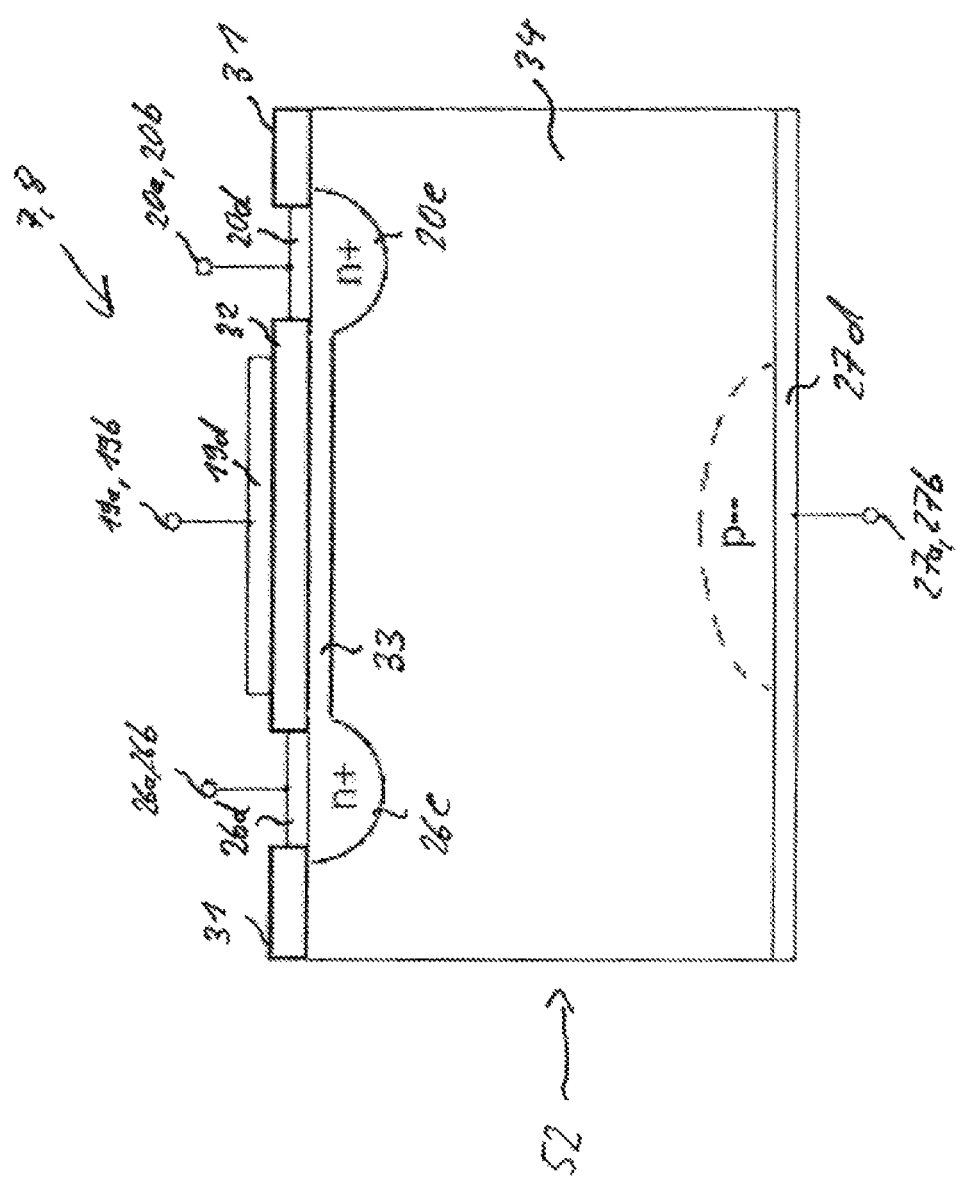
FIG. 3 schematically represents an embodiment of a field-effect transistor element according to one embodiment of the apparatus for converting the electrical power of an electromagnetic wave into a DC electrical voltage signal.

FIG. 3 represents an embodiment of a field-effect transistor element 7, 8 according to one embodiment of the apparatus 1 for converting the electrical power of an electromagnetic wave 2 into a DC electrical voltage signal 3.

According to the embodiment of FIG. 3, the first field-effect transistor element 7 and/or the second field-effect transistor element 8 may comprise a gate terminal 19a, 19b, a bulk terminal 27a, 27b, a source terminal 26a, 26b, a drain terminal 20a, 20b, a protective oxide 31 protecting the component, a source terminal material 26d, a drain terminal material 20d, a bulk terminal material 27d and a gate terminal material 19d, it being possible to provide metals for the aforementioned terminal materials. A gate oxide 32 may insulate a gate terminal material 19d from a controllable gate channel 33. Source doping 26e and drain doping 20e respectively comprise first doping, i.e. n-doping or p-doping, and a substrate 52 has a second doping which is the opposite thereof. The substrate 52 may have a relatively high-impedance resistance in the range of from 500Ω×cm to 5000Ω×cm. Such a high-impedance substrate resistance may be obtained by suitable doping. Compared with a conventional field-effect transistor element, in the case of such doping a much larger depletion zone 34 can be induced in the substrate 52. Such a much larger depletion zone 34 lying below the gate channel 33 may be suitable for reducing or avoiding a body effect of the first field-effect transistor element 7 and/or of the second field-effect transistor element 8. This may have a positive effect on the avoidance of at least one harmonic of the received electromagnetic wave 2. In this way, the configuration of the first field-effect transistor element 7 and/or of the second field-effect transistor element 8 may have a positive effect on the avoidance of the first harmonic of the received electromagnetic wave 2, or of each odd harmonic.

Figure 4:
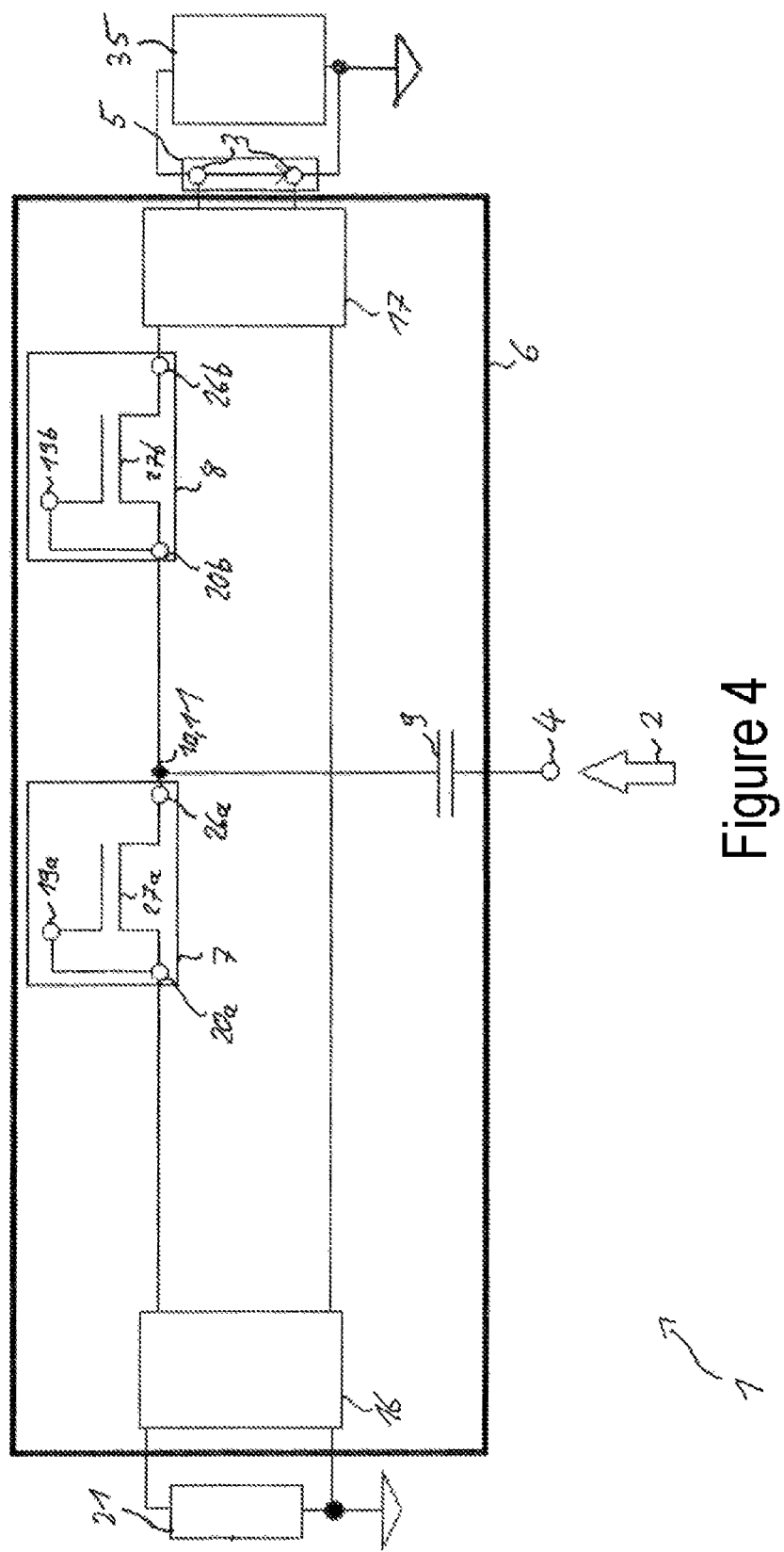
FIG. 4 schematically represents an alternative embodiment, which is connected to an electrical load, this embodiment comprising a first and second impedance conversion unit as well as an additional voltage source for providing an electrical bias voltage.

FIG. 4 schematically represents an alternative embodiment, which is connected to an electrical load 35, this embodiment comprising a first and second impedance conversion unit 16, 17 and an additional voltage source 21 for providing an electrical bias voltage.

FIG. 4 represents an alternative embodiment to the embodiment of FIG. 1. The alternative embodiment according to FIG. 4 differs from the embodiment of FIG. 1 inter alia in that according thereto a first linearization element 12 and a second linearization element 13 are not provided. Furthermore, compared with the embodiment of FIG. 1, FIG. 4 additionally comprises a first impedance conversion unit 16 and a second impedance conversion unit 17. The embodiment according to FIG. 4 furthermore comprises an additional voltage source 21 which may be provided in order to provide a bias voltage for the first field-effect transistor element 7, for the second field-effect transistor element 8 and/or for the first impedance conversion unit 16 and for the second impedance conversion unit 17. FIG. 4 furthermore shows a DC electrical voltage signal 3 provided in the signal output region 5. This signal is coupled to an electrical load 35, by means of which the DC electrical voltage signal 3 provided may be used for the respective application.

As shown in FIG. 4, the first impedance conversion unit 16 may be electrically coupled directly to the additional voltage source 21 and/or arranged directly thereat. Furthermore, the second impedance conversion unit 17 may be electrically coupled directly to the signal output region 5 and/or arranged directly thereat. Such an arrangement may in some embodiments obtain a higher circuit symmetry of the first conversion device 6, since an identical impedance can thereby be achieved both in the region depicted on the left of the node 11 and in the region of FIG. 4 depicted on the right of the node 11. Such a configuration may in some embodiments be suitable for avoiding at least one harmonic of the electromagnetic wave 2.

The provision of the additional voltage source 21 is optional in the embodiment of FIG. 4. Its provision of a bias voltage may optimize the power consumption of the apparatus 1 and contribute to fixing the operating point of the first field-effect transistor element 7 and/or of the second field-effect transistor element 8, and therefore reduce the temperature dependency of the field-effect transistors.

Furthermore, the additional voltage source 21 may permit accelerated conversion of the electrical power of the electromagnetic wave 2 into the DC electrical voltage signal 3 inside the first conversion device 6. In this way, for example, for a first conversion device 6 configured for power detection, the detection of the power to be detected may take place more rapidly.

Figure 5B:
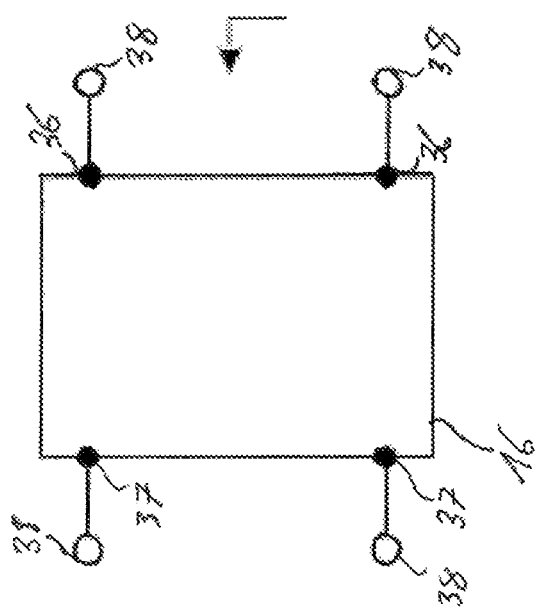
FIG. 5, which comprises FIG. 5a and FIG. 5b, schematically represents embodiments of an impedance conversion unit according to one embodiment of the apparatus for converting the electrical power of an electromagnetic wave into a DC electrical voltage signal.
Figure 5A:
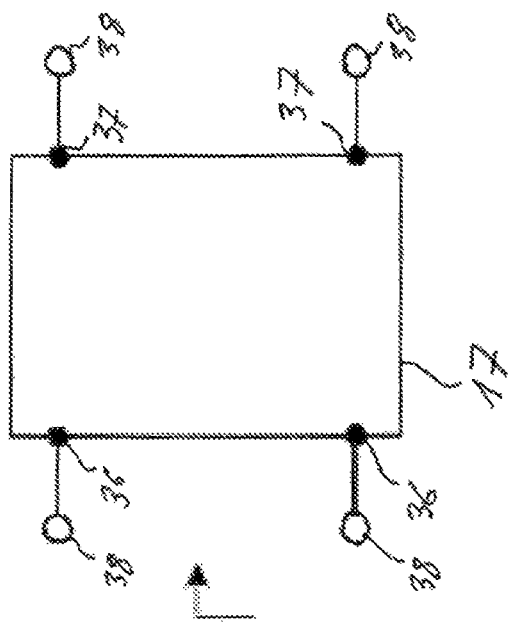

FIG. 5, which comprises FIG. 5a and FIG. 5b, represents embodiments of an impedance conversion unit 16, 17 according to one embodiment of the apparatus 1 for converting the electrical power of an electromagnetic wave 2 into a DC electrical voltage signal 3.

FIG. 5a represents the first impedance conversion unit 16. In this case, terminal points 38 for electrical connection of the first conversion device 6 may be electrically coupled according to the alternative embodiment of FIG. 4. In such a case, according to FIG. 5a, the signal input into the impedance conversion unit 16 may take place via inputs 36 and the signal output from the first impedance conversion unit 16 may take place via outputs 37.

FIG. 5b represents the second impedance conversion unit 17. In this case, terminal points 38 for electrical connection of the first conversion device 6 may be electrically coupled according to the alternative embodiment of FIG. 4. In such a case, according to FIG. 5b, the signal input into the impedance conversion unit 16 may take place via inputs 36 and the signal output from the first impedance conversion unit 16 may take place via outputs 37.

Figure 6A:
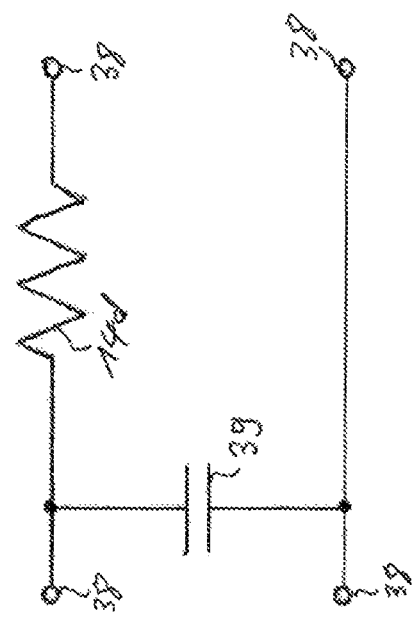
FIG. 6, which comprises FIG. 6a and FIG. 6b, schematically represents embodiments of an impedance conversion unit in the configuration as RC elements according to one embodiment of the apparatus for converting the electrical power of an electromagnetic wave into a DC electrical voltage signal.
Figure 6B:
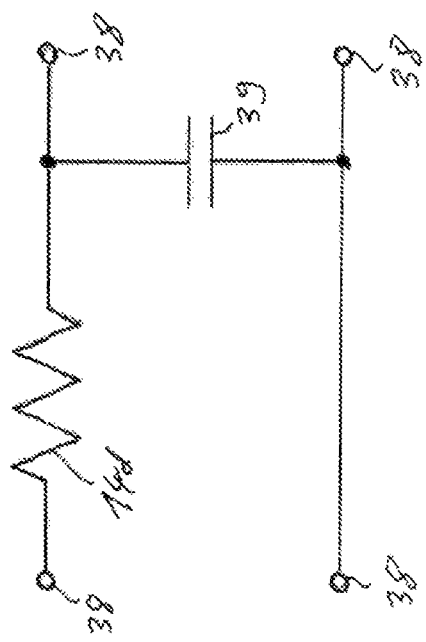

FIG. 6, which comprises FIG. 6a and FIG. 6b, schematically represents embodiments of an impedance conversion unit 16, 17 in the configuration as RC elements 18 according to one embodiment of the apparatus 1 for converting the electrical power of an electromagnetic wave 2 into a DC electrical voltage signal 3.

FIG. 6a and FIG. 6b represent RC elements 18, which relate to the specific configuration of the first impedance conversion unit 16 and/or the second impedance conversion unit 17. They respectively comprise a resistor 14d and a capacitor 39. The terminal points 38 are configured according to the alternative embodiment of FIG. 4 for electrical coupling to the circuit of the first conversion device 6. Other configurations of RC elements are also possible.

Figure 7:
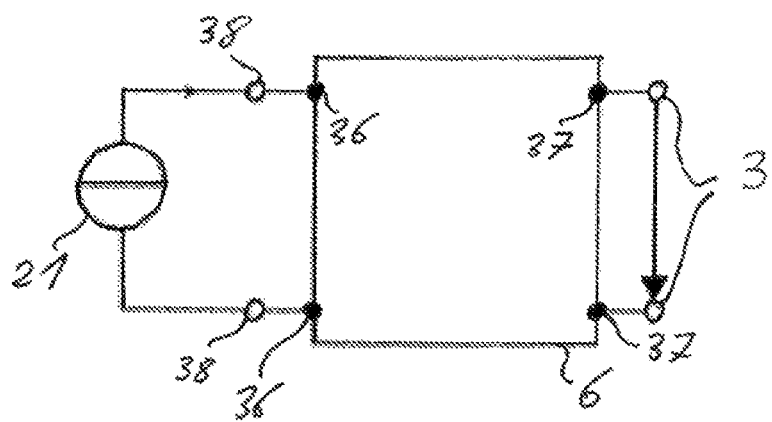
FIG. 7 schematically represents an alternative embodiment in which the first conversion device is electrically coupled to an additional voltage source for providing an electrical bias voltage.

FIG. 7 schematically represents an alternative embodiment, in which the first conversion device 6 is electrically coupled to an additional voltage source 21 for providing an electrical bias voltage.

According to the embodiment of FIG. 7, the additional voltage source 21 for providing the bias voltage may be electrically coupled to the first conversion device 6. FIG. 7 does not contain a full configuration of the apparatus 1, but instead serves to explain the provision of this bias voltage to the conversion device 6. The bias voltage of the additional voltage source 21 may be a DC voltage. In respect of the technical effects and advantages resulting therefrom of many such embodiments, reference is made to the comments according to the alternative embodiment of FIG. 4. The additional voltage source 21 may be coupled to the first conversion device 6 via terminal points 38. In this case, inputs 36 may be used for the signal input from the additional voltage source 21 to the first conversion device 6. The first conversion device 6 is configured for conversion of the electrical power of the electromagnetic wave 2 (not represented) into a DC electrical voltage signal 3 under the additional influence of the bias voltage of the additional voltage source 21. After the conversion of the electrical power of the electromagnetic wave 2, a signal output may take place from the first conversion device 6 via outputs 37, so that a DC electrical voltage signal 3 can be provided in the signal output region 5.

Figure 8:
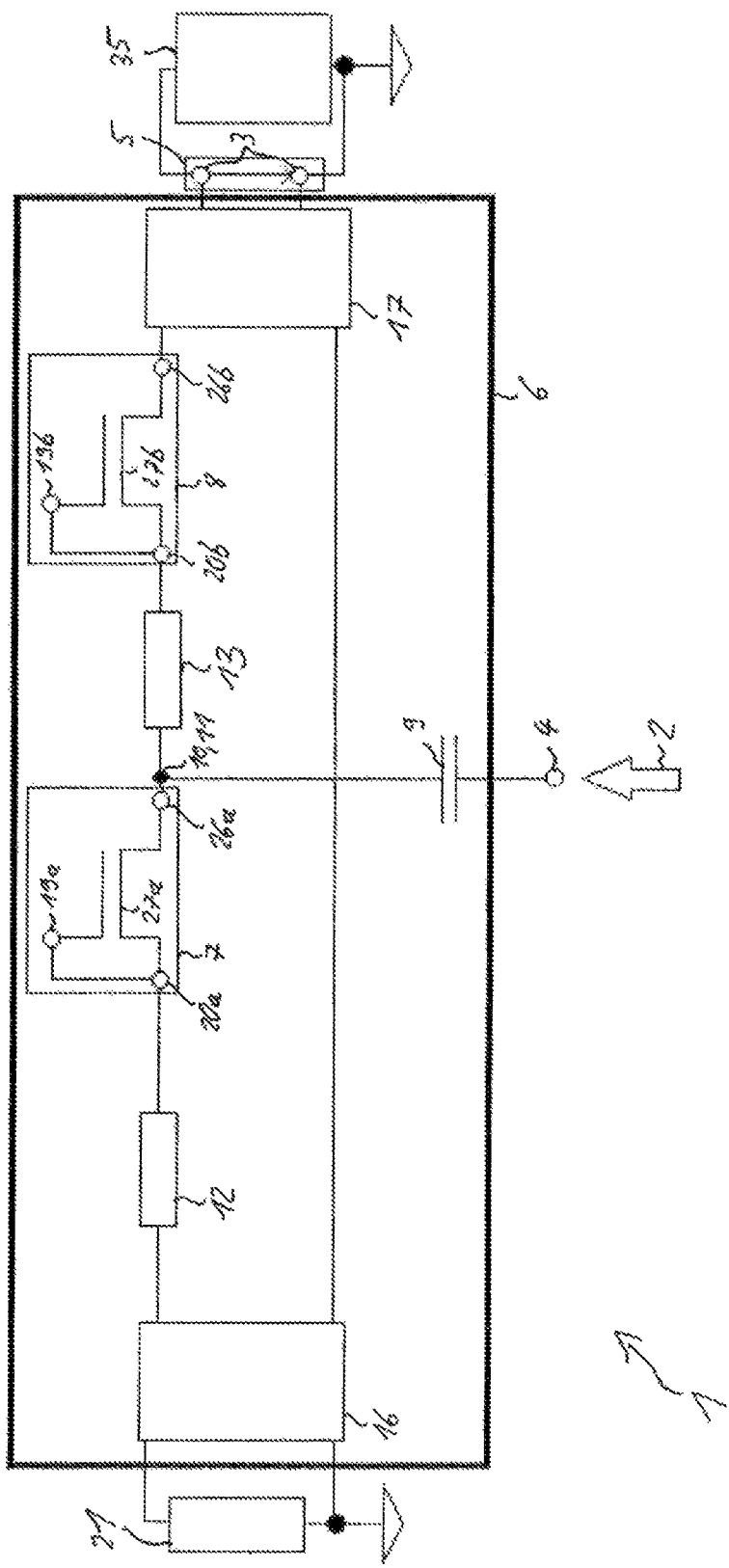
FIG. 8 schematically represents an alternative embodiment, which is connected to an electrical load, this embodiment comprising a first and second impedance conversion unit, an additional voltage source for providing an electrical bias voltage and a first and second linearization element.

FIG. 8 schematically represents an alternative embodiment, which is connected to an electrical load 35, this embodiment comprising a first and second impedance conversion unit 16, 17, an additional voltage source 21 for providing an electrical bias voltage, and a first and second linearization element 12, 13.

Compared with the alternative embodiment according to FIG. 4, the alternative embodiment according to FIG. 8 additionally comprises a first linearization element 12 and a second linearization element 13. The functionality, structural arrangement and configuration of the first linearization element 12 and/or of the second linearization element 13 may be configured according to the embodiments and comments relating to FIGS. 1 and 2. Such an additional configuration of these linearization elements may favor avoidance of the second harmonic oscillation or each even harmonic oscillation of the received electromagnetic wave 2.

Figure 9:
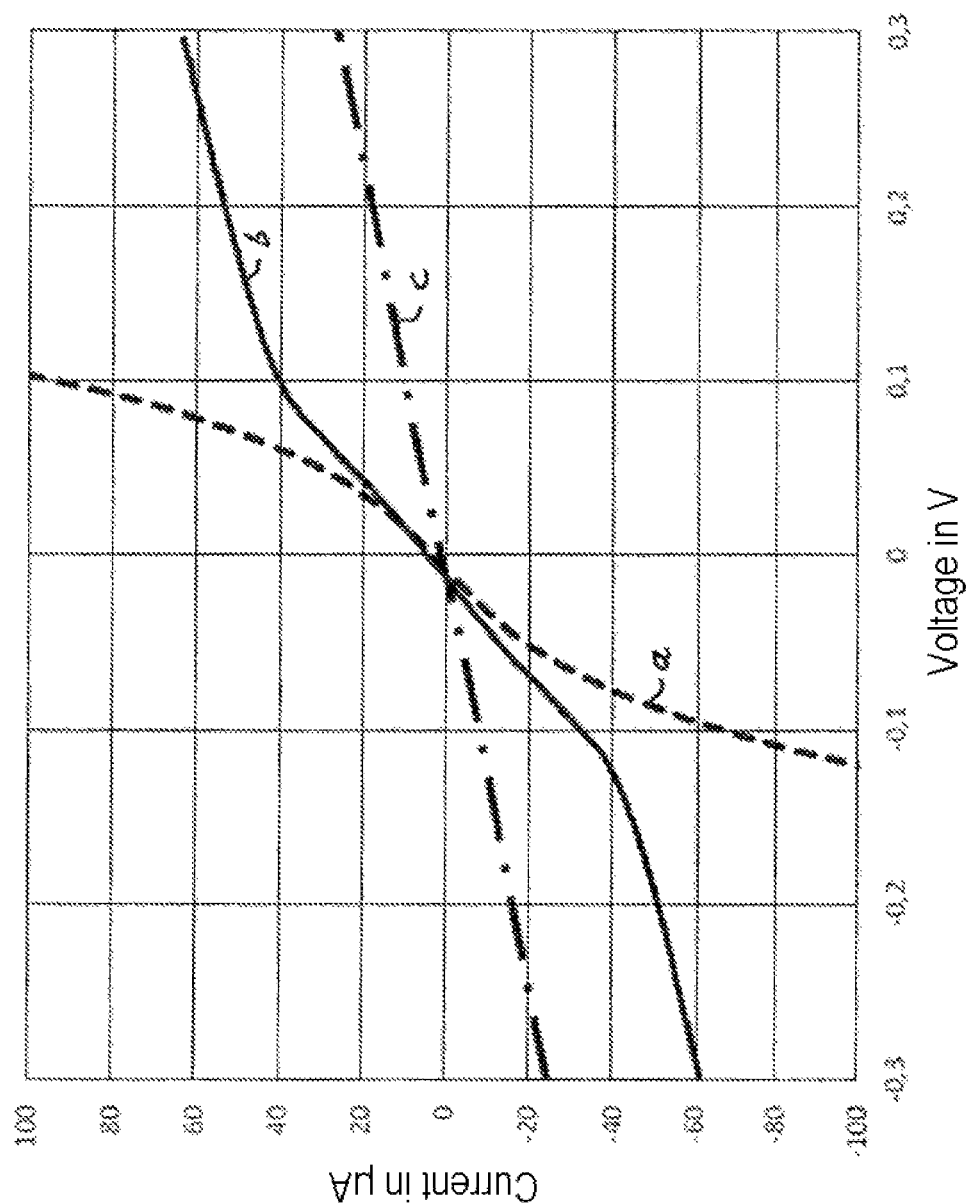
FIG. 9 represents in diagram form current/voltage characteristics which are to be assigned to different embodiments.

FIG. 9 represents in diagrammatic form current/voltage characteristics which are to be assigned to different embodiments.

FIG. 9 relates to simulation results which are based on the differing configuration of the first conversion device 6. The specific simulation results are in this case used only for illustration, and the actual values may vary according to the implementation. The voltage plotted on the x axis in this case relates to the input voltage associated with the power of the electromagnetic wave 2 received in the signal input region 4. The current strength plotted on the y axis relates to a linearized input current, the linearization of this current being contingent on the respective configuration of the first linearization element 12 and/or of the second linearization element 13. FIG. 9 comprises the graphs a, b and c, the current/voltage characteristics of which differ because of a different linearization device of the associated respective first conversion device 6.

Referring to graph a of FIG. 9, this represents a current/voltage characteristic which relates to a first conversion device 6 which does not comprise a linearization device, i.e. it does not comprise a first linearization element 12 and does not comprise a second linearization element 13. In such case, the current/voltage characteristic has a behavior with strongly pronounced nonlinearity. Such a configuration is in some cases not very suitable for avoiding at least one harmonic of the electromagnetic wave 2.

Referring to graph b of FIG. 9, this represents a current/voltage characteristic which relates to a first conversion device 6 which comprises a first linearization element 12 and a second linearization element 13. In this case, the first linearization element 12 is arranged between the gate terminal 19a and drain terminal 20a of the first field-effect transistor element 7, and the second linearization element 13 is arranged between the gate terminal 19b and drain terminal 20b of the second field-effect transistor element 8. Compared with graph a, graph b has a less pronounced nonlinearity. Such a configuration is therefore suitable in some cases for avoiding at least one harmonic of the electromagnetic wave 2.

Referring to graph c of FIG. 9, this represents a current/voltage characteristic which relates to a first conversion device 6 which comprises a first linearization element 12 and a second linearization element 13. In this case, the first linearization element 12 is arranged in series with the first field-effect transistor element 7, and the second linearization element 13 is arranged in series with the second field-effect transistor element 8. Compared with graph a, graph c has a less pronounced nonlinearity. Such a configuration is therefore suitable in principal for avoiding at least one harmonic of the electromagnetic wave 2. Graph c furthermore has a less pronounced nonlinearity compared with graph b.

FIG. 10 schematically represents an alternative embodiment, which relates to the additional upstream provision of a balun 42, this embodiment comprising a first, second and third linearization element 12, 13, 43, as well as a first and second capacitive element 9, 40.

Compared with the embodiment of FIG. 1, the alternative embodiment according to FIG. 10 furthermore has a third field-effect transistor element 44—comprising a gate terminal 19c, a drain terminal 20c, a source terminal 26c and a bulk terminal 27c, the third field-effect transistor element 44 according to FIG. 10 being electrically coupled to the second field-effect transistor element 8 via a third linearization element 43 and a further coupling element 10 in the configuration of a node 11. In this case, the third field-effect transistor element 44 may be electrically coupled directly to the signal output region 5 and/or arranged directly at this signal output region 5.

Compared with the embodiment of FIG. 1, the alternative embodiment according to FIG. 10 is not configured so that the electromagnetic wave 2 received in the signal input region 4 enters the first conversion device 6 directly and unchanged. Instead, the apparatus according to FIG. 10 furthermore comprises a balun 42, which may be connected before the first conversion device 6 and which is configured in order to modify the received electromagnetic wave 2.

This balun 42 may be configured so that an electromagnetic wave 2 received in the signal input region 4 is modified by this balun 42 before the signal of this electromagnetic wave 2 enters the first conversion device 6. The balun 42 may in this case be configured as a magnetic transformer. Also, according to FIG. 10, a second capacitive element 40 may be configured in the first conversion device 6. This second capacitive element 40 may be coupled between the balun 42 and the third field-effect transistor element 44. This second capacitive element 40 may also be arranged parallel to the first capacitive element 9. This second capacitive element 40 may also comprise or be an identical component to the first capacitive element 9.

According to the alternative configuration of FIG. 10, the modification of the received electromagnetic wave 2 by the balun 42 may take place in such a way that the input signal of the received electromagnetic wave 2 is converted into a differential input signal, which is delivered via the first capacitive element 9 and the second capacitive element 40 as a modified electromagnetic wave signal 41a, 41b into the first conversion device 6. Such a modification may, in the case of a configuration of the apparatus 1 configured for power detection, improve the sensitivity of such a power detector.

Figure 11A:
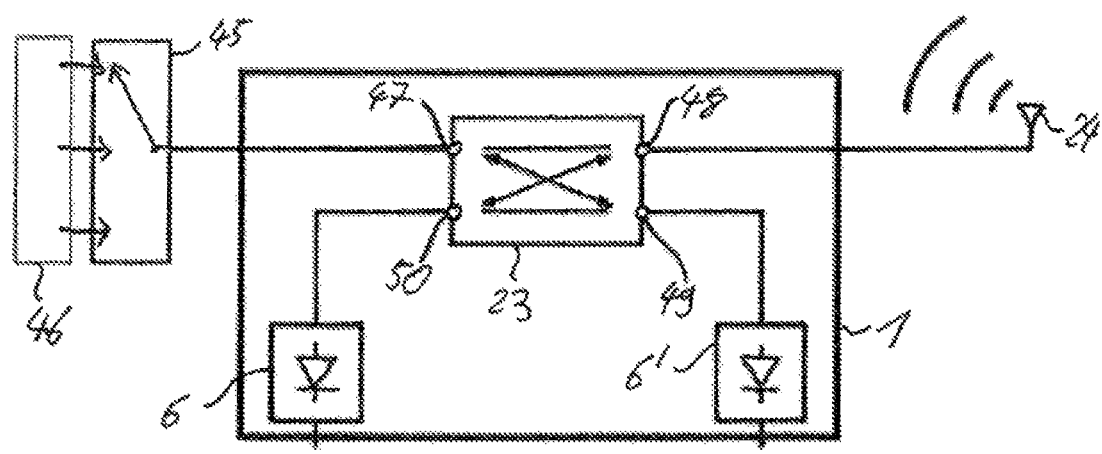
FIG. 11, which comprises FIG. 11a and FIG. 11b, schematically represents two further alternative embodiments in connection with further components. According to the alternative embodiment represented in FIG. 11a, it is connected to an antenna, an antenna switching module and a power amplifier, and furthermore comprises a directional coupler element. According to the alternative embodiment represented in FIG. 11b, it furthermore comprises a shunt high-frequency switch electrically coupled to the first conversion device.
Figure 11B:
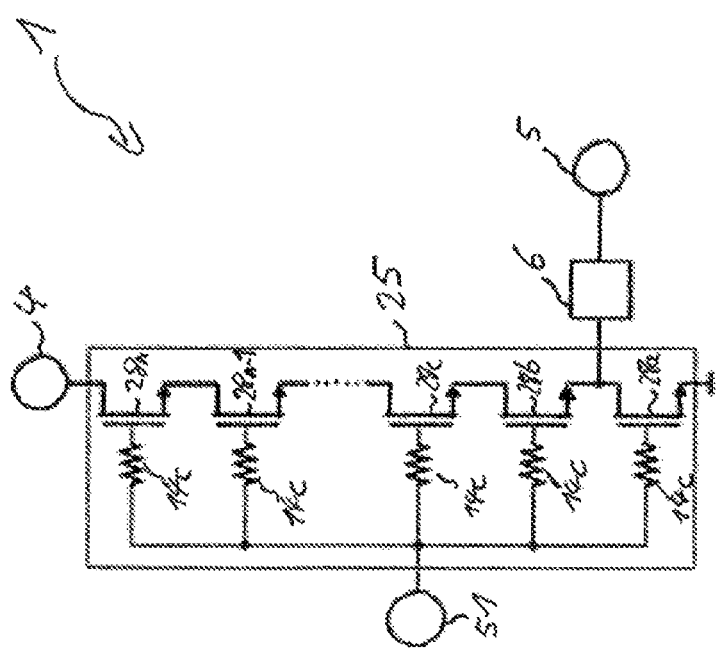

FIG. 11, which comprises FIG. 11a and FIG. 11b, schematically represents two further alternative embodiments in connection with further components. According to the alternative embodiment represented in FIG. 11a, it is represented as being connected to an antenna 24, an antenna switching module 45 and a power amplifier 46, and furthermore comprises a directional coupler element 23. According to the alternative embodiment represented in FIG. 11b it furthermore comprises shunt high-frequency switches 25 electrically coupled to the first conversion device 6.

According to the alternative embodiment of FIG. 11a, the apparatus 1 is suitable for the power detection of high-frequency waves. According to this embodiment, the apparatus comprises at least a first conversion device 6, a second conversion device 6' and a directional coupler element 23. In such a configuration, the apparatus 1 may be configured for feedback with an antenna 24 which emits the electromagnetic wave 2, and interact in an environment comprising the antenna 24, a power amplifier 46 and an antenna switching module 45.

The directional coupler element 23 may in this case comprise an input terminal 47, a transmission terminal 48, a coupled terminal 49 and an insulated terminal 50. The directional coupler element 23 may be operated in forward-directed operation, that is to say with signal transmission from the power amplifier 46 to the antenna 24, or in backward-directed operation, that is to say with signal transmission from the antenna 24 to the power detector, or the power amplifier 46.

In forward-directed operation, a desired power signal is provided by the power amplifier 46 and delivered via the antenna switching module 45 to the input terminal 47. The main part of the desired power signal may be supplied via the transmission terminal 48 to the antenna 24, so that the power of the antenna 24 can be adapted to the desired power signal of the power amplifier. In addition, a small fraction of the power of the power amplifier may be supplied via the coupling of the input terminal 47 with the coupled terminal 49 of the directional coupler element of the second conversion device 6' configured for power detection. By means of the second conversion device 6' configured for power detection, it is in this case possible to check whether the power signal provided by the power amplifier 46 corresponds to the desired power signal. The signal detected by the second conversion device 6' may be transmitted to a control unit (not represented), so that the power amplifier 46 can be adapted in such a way that the desired power signal can be transmitted to the antenna 24.

In backward-directed operation, a high-frequency signal of the power adjusted for the antenna 24 is transmitted to the transmission terminal 48 of the directional coupler element 23. By means of the coupling of the transmission terminal 48 and the insulated terminal 50, a small fraction of the antenna power can in this case be extracted and transmitted to the first conversion device 6 configured for power detection. By means of the first conversion device 6, the emitted power can be detected and the detected value can be transmitted to a control unit (not represented), which in this way can adapt the power amplification by the power amplifier 46 to a desired emission power.

According to the alternative embodiment of FIG. 11b the apparatus 1 may furthermore comprise a shunt high-frequency switch 25 electrically coupled to the first conversion device 6. The shunt high-frequency switch 25 may be electrically coupled between the signal input region 4 and the first conversion device 6 and/or may be arranged between the signal input region 4 and the first conversion device 6. According to the embodiment of FIG. 11*b*, the shunt high-frequency switch 25 may be configured for analog preprocessing. An output signal of this preprocessing may be supplied to the first conversion device 6. The shunt high-frequency switch 25 comprises a multiplicity of field-effect transistors 28*a* . . . 28*n* in a series arrangement, it being possible to control the electrical gate potential of each field-effect transistor 28*a* . . . 28*n* by means of a switch control 51, respectively via an ohmic resistance 14*c*. The specification of the field-effect transistors 28*a* . . . 28*n* may furthermore be adjusted in such a way that they are configured in the normally off mode. The analog preprocessing by means of the shunt high-frequency switch 25 may provide optimized electrical signals for the first conversion device 6, by means of which signals the conversion in the first conversion device 6 can be accomplished as effectively as possible with, at the same time, a mode of operation which is gentle on the components.

Although aspects above have been described with reference to the illustrative embodiments, this description should nevertheless not be interpreted in a restrictive sense. Various modifications and combinations of the illustrative embodiments, as well as other embodiments, will be apparent to persons skilled in the art when referring to the description. As an illustration, the embodiments described in the figures may be combined with one another in alternative embodiments. It is therefore intended that the appended claims comprise all such modifications or embodiments.

The following examples are particular embodiments of the present invention.

Example 1

Apparatus for converting an electrical power of an electromagnetic wave into a DC electrical voltage signal, comprising a signal input region for receiving the electromagnetic wave, a signal output region for providing the DC electrical voltage signal, and a first conversion device, the first conversion device comprising at least:
- a first field-effect transistor element,
- a second field-effect transistor element, which is electrically coupled to the signal output region, the second field-effect transistor element being configured for series coupling to the first field-effect transistor element,
- at least one first capacitive element, which is electrically coupled to the signal input region,
- wherein the first conversion device is configured in order to avoid at least one harmonic of the electromagnetic wave.

Example 2

Apparatus according to Example 1, wherein the first conversion device is configured in order to avoid all even and/or all odd harmonics of the electromagnetic wave.

Example 3

Apparatus according to Example 1, wherein the first field-effect transistor element, the second field-effect transistor element and the capacitive element are electrically coupled to one another by at least one common coupling element.

Example 4

Apparatus according to Example 3, wherein the common coupling element is a common node.

Example 5

Apparatus according to Example 1, wherein the first field-effect transistor element and/or the second field-effect transistor element has a substrate resistance $R \geq 500\Omega \times cm$.

Example 6

Apparatus according to Example 1, wherein the first conversion device furthermore comprises a first linearization element and a second linearization element, the first linearization element being electrically coupled to the first field-effect transistor element and the second linearization element being electrically coupled to the second field-effect transistor element.

Example 7

Apparatus according to Example 6, wherein the first linearization element and/or the second linearization element is an ohmic resistance and/or a high-frequency switch.

Example 8

Apparatus according to Example 1, wherein the first conversion device furthermore comprises at least one first impedance conversion unit and one second impedance conversion unit, the first impedance conversion unit being electrically coupled to the first field-effect transistor element and the second impedance conversion unit being electrically coupled to the second field-effect transistor element.

Example 9

Apparatus according to Example 8, wherein the first impedance conversion unit and/or the second impedance conversion unit comprises an RC element.

Example 10

Apparatus according to Example 1, wherein the electrical coupling of the first capacitive element and the signal input region furthermore comprises a balun, which is electrically coupled to the capacitive element and to the signal input region.

Example 11

Apparatus according to Example 10, wherein the balun is configured as a magnetic transformer.

Example 12

Apparatus according to Example 1, wherein the first field-effect transistor element comprises a first gate terminal and a first drain terminal, and the second field-effect transistor element comprises a second gate terminal and a second drain terminal, the first gate terminal being short-circuited to the first drain terminal and the second gate terminal being short-circuited to the second drain terminal.

Example 13

Apparatus according to Example 1, wherein the first conversion device is electrically coupled to an additional voltage source for providing an electrical bias voltage.

Example 14

Apparatus according to Example 1, wherein the at least one capacitive element comprises a multiplicity of capacitors arranged in series.

Example 15

Apparatus according to Example 1, wherein the first field-effect transistor element and/or the second field-effect transistor element is a silicon-on-insulator field-effect transistor.

Example 16

Apparatus according to Example 1, which is configured for power detection of the electromagnetic wave in the high-frequency range.

Example 17

Apparatus according to Example 16, furthermore comprising a second conversion device and a directional coupler element, which is electrically coupled to the first conversion device and to the second conversion device and makes it possible to feed back the detected power to an antenna emitting the electromagnetic wave.

Example 18

Apparatus according to Example 16, furthermore comprising a shunt high-frequency switch, which is electrically coupled to the first conversion device and is connected before the first conversion device.

Example 19

Mobile telephony device which comprises the apparatus according to one of the preceding examples and is based on a long-term evolution (LTE) standard.

The invention claimed is:

1. An apparatus for converting an electrical power of an electromagnetic wave into a DC electrical voltage signal, comprising:
   a signal input region for receiving the electromagnetic wave;
   a signal output region for providing the DC electrical voltage signal; and
   a first conversion device configured to convert the electrical power of the electromagnetic wave into the DC electrical voltage signal, the first conversion device comprising:
      a first field-effect transistor element;
      a second field-effect transistor element, which is electrically coupled to the signal output region, the second field-effect transistor element being configured for series coupling to the first field-effect transistor element;
      at least one first capacitive element, which is electrically coupled to the signal input region; and
      a first linearization element and a second linearization element, the first linearization element being electrically coupled to the first field-effect transistor element, and the second linearization element being electrically coupled to the second field-effect transistor element,
   wherein the first conversion device is configured to prevent an occurrence of at least one harmonic of the electromagnetic wave.

2. The apparatus as claimed in claim 1, wherein the first conversion device is configured in order to prevent all even and/or all odd harmonics of the electromagnetic wave.

3. The apparatus as claimed in claim 1, wherein the first field-effect transistor element, the second field-effect transistor element, and the at least one first capacitive element are electrically coupled to one another by at least one common coupling element.

4. The apparatus as claimed in claim 3, wherein the common coupling element is a common node.

5. The apparatus as claimed in claim 1, wherein the first field-effect transistor element and/or the second field-effect transistor element has a substrate resistance $R \geq 500\Omega \times cm$.

6. The apparatus as claimed in claim 1, wherein the first linearization element and/or the second linearization element is configured as an ohmic resistance and/or a high-frequency switch.

7. The apparatus as claimed in claim 1, wherein the first conversion device further comprises at least one first impedance conversion unit and at least one second impedance conversion unit, the at least one first impedance conversion unit being electrically coupled to the first field-effect transistor element, and the at least one second impedance conversion unit being electrically coupled to the second field-effect transistor element.

8. The apparatus as claimed in claim 7, wherein the at least one first impedance conversion unit and/or the at least one second impedance conversion unit comprises an RC element.

9. The apparatus as claimed in claim 1, further comprising a balun,
   wherein the at least one first capacitive element and the signal input region are electrically coupled to one another via the balun.

10. The apparatus as claimed in claim 9, wherein the balun is configured as a magnetic transformer.

11. The apparatus as claimed in claim 1, wherein the first field-effect transistor element comprises a first gate terminal and a first drain terminal, and the second field-effect transistor element comprises a second gate terminal and a second drain terminal, the first gate terminal being short-circuited to the first drain terminal, and the second gate terminal being short-circuited to the second drain terminal.

12. The apparatus as claimed in claim 1, wherein the first conversion device is electrically coupled to an additional voltage source for providing an electrical bias voltage.

13. The apparatus as claimed in claim 1, wherein the at least one first capacitive element comprises a multiplicity of capacitors arranged in series.

14. The apparatus as claimed in claim 1, wherein the first field-effect transistor element and/or the second field-effect transistor element is a silicon-on-insulator field-effect transistor.

15. The apparatus as claimed in claim 1, wherein the signal output region for providing the DC electrical voltage signal enables power detection of the electromagnetic wave in the high-frequency range.

16. The apparatus as claimed in claim 15, further comprising:
   a second conversion device; and
   a directional coupler element electrically coupled to the first conversion device and to the second conversion device,
   wherein the directional coupler is configured to feed back the detected power to an antenna emitting the electromagnetic wave.

17. The apparatus as claimed in claim 15, further comprising:
   a shunt high-frequency switch electrically coupled to the first conversion device, wherein the shunt high-frequency switch and is connected between the first conversion device and the signal input region.

18. The apparatus as claimed in claim 1, wherein the apparatus is a mobile telephony device that is configured to operate in accordance with a long-term evolution (LTE) standard.

19. The apparatus as claimed in claim 1, wherein the first conversion device is configured to prevent a formation of harmonics of the electromagnetic wave as via (i) a configuration of the first field-effect transistor element, the second field-effect transistor element, and a substrate resistance R associated with the first field-effect transistor element and the second field-effect transistor element greater than or equal to 500 Ω×cm, which results in a prevention of a first harmonic or each odd harmonic of the electromagnetic wave, and (ii) a configuration of the first linearization element and the second linearization element, which results in a prevention of a second harmonic or each even harmonic of the electromagnetic wave.

20. An apparatus for converting an electrical power of an electromagnetic wave into a DC electrical voltage signal, comprising:
   a signal input region for receiving the electromagnetic wave;
   a signal output region for providing the DC electrical voltage signal; and
   a first conversion device configured to convert the electrical power of the electromagnetic wave into the DC electrical voltage signal, the first conversion device comprising:
      a first field-effect transistor element;
      a second field-effect transistor element, which is electrically coupled to the signal output region, the second field-effect transistor element being configured for series coupling to the first field-effect transistor element;
      at least one first capacitive element, which is electrically coupled to the signal input region; and
      at least one first impedance conversion unit and at least one second impedance conversion unit, the at least one first impedance conversion unit being electrically coupled to the first field-effect transistor element, and the at least one second impedance conversion unit being electrically coupled to the second field-effect transistor element,
   wherein the first conversion device is configured to prevent an occurrence of at least one harmonic of the electromagnetic wave.

* * * * *